Oct. 24, 1944.　　　G. R. STIBITZ　　　2,361,246
CARD TRANSLATOR
Filed May 5, 1943　　　4 Sheets-Sheet 1
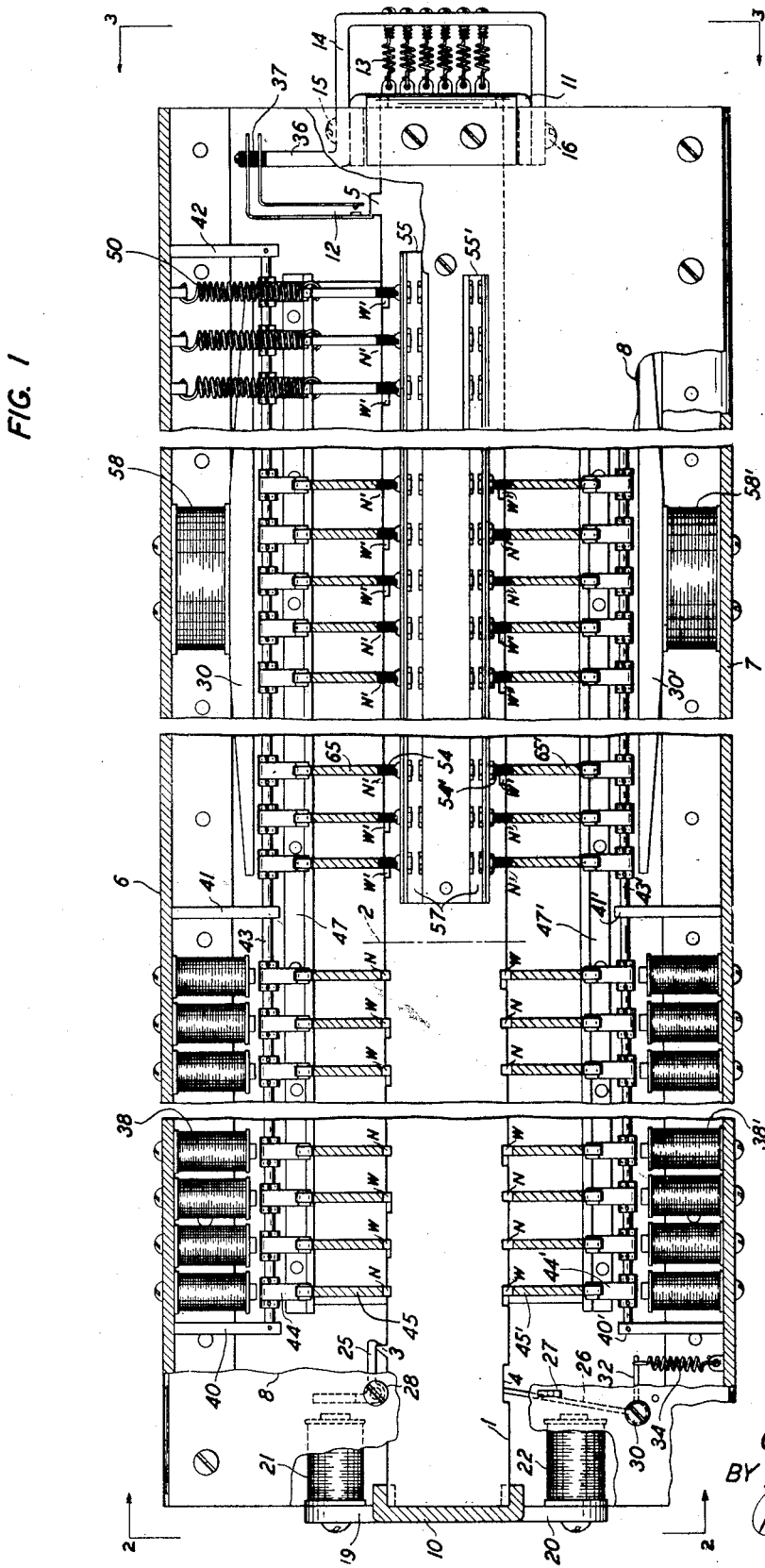
FIG. 1
INVENTOR
G. R. STIBITZ
BY
ATTORNEY Oct. 24, 1944.  G. R. STIBITZ  2,361,246
CARD TRANSLATOR
Filed May 5, 1943  4 Sheets-Sheet 2

INVENTOR
G. R. STIBITZ
BY
ATTORNEY

Oct. 24, 1944.  G. R. STIBITZ  2,361,246
CARD TRANSLATOR
Filed May 5, 1943  4 Sheets-Sheet 3

INVENTOR
G. R. STIBITZ
BY
ATTORNEY

Oct. 24, 1944.  G. R. STIBITZ  2,361,246
CARD TRANSLATOR
Filed May 5, 1943  4 Sheets-Sheet 4
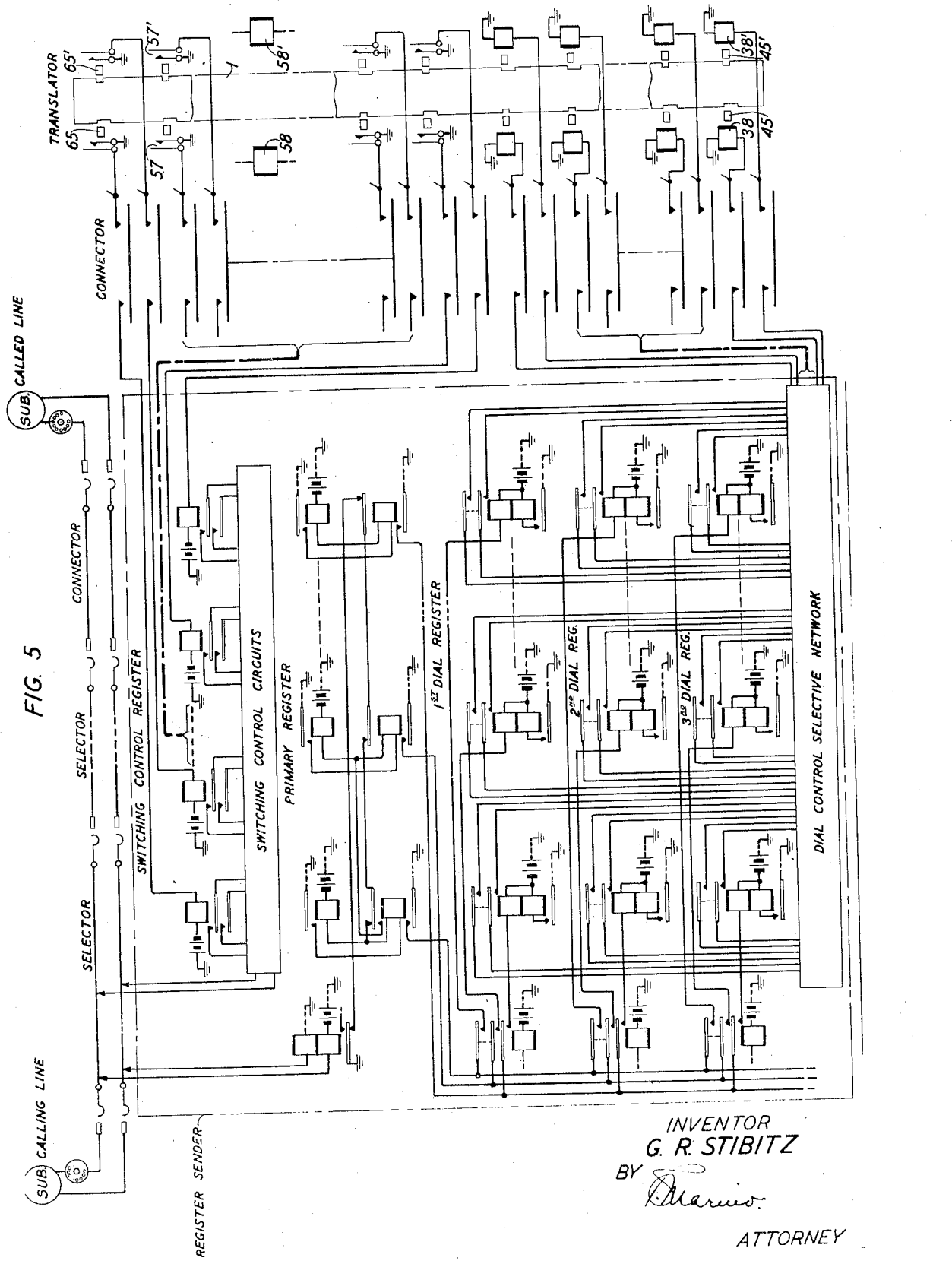
FIG. 5
INVENTOR
G. R. STIBITZ
BY
ATTORNEY Patented Oct. 24, 1944

2,361,246

UNITED STATES PATENT OFFICE 2,361,246

CARD TRANSLATOR

George R. Stibitz, Boonton, N. J., assignor to Bell Telephone Laboratories, Incorporated, New York, N. Y., a corporation of New York Application May 5, 1943, Serial No. 485,734

19 Claims. (Cl. 179—18)

This invention relates to translators and more particularly to translators of the "card" type in which information correlated to a specific item of inquiry is recorded in code along one or more edges of a selectable card, to control, upon the selection of the card, the setting of electrical or other suitable devices in accordance with the information recorded upon the card selected.

One of the objects of the invention is a translator of this general character in which the selection of the different cards and the setting of the devices in response to said selection, are effected by instrumentalities which are responsive to a uniform code recorded along the edges of the cards, in which the "selection code" indicating the item of inquiry comprises a series of wide and narrow notches selectively arranged and correspondingly spaced along one or more edges of each card to form, when the cards are arranged in a stack, a set of grooves of varying widths into which a first set of controllable bars may be selectively inserted for the purpose of selecting a card from the stack, and in which the "reading code" indicating the information corresponding to each inquiry comprises another series of wide and narrow notches also selectively arranged and correspondingly spaced along one or more edges of each card, when the cards are arranged in a stack, another set of grooves of varying widths into which, subsequent to the selection of a card from the stack, a second set of controllable bars may be selectively inserted to indicate the information recorded on the card selected.

In one of its many applications, the invention finds ready use in automatic telephone switching, wherein the dialed office code of a wanted connection is to be translated into the trunk group route that leads in the desired direction, and into additional information required by the switching control mechanisms to successfully establish the call beyond the selected trunk in the trunk group. According to one practice of establishing automatic telephone connections in large multioffice areas as exemplified, for example, by Patent 1,862,549, granted to R. Raymond et al. on June 14, 1932, the dial registers of the sender connected to the calling line are set by the trains of dial pulses which designate the called office, and this setting is then transmitted to a common "decoder" which includes a register that operates in response to the setting of the sender dial register to selectively complete a circuit to a relay individual to the wanted office. This relay, when operated, selectively operates a switching control register in the sender which, after its operation, controls the selective positioning of the necessary switching selectors to reach the wanted line.

In large metropolitan areas involving many central offices, the decoder (of which one or more must be provided in every central office), is of necessity a costly piece of equipment since it must have a register settable by the dial registers, a "route" relay for each office and, of course, the necessary intra-relay wiring between the decoder register and the different route relays to provide a separate operating circuit for each of the latter relays.

According to my invention, the decoder used in automatic telephone switching as above described, would be replaced by the simpler card translator herein set forth and claimed, wherein each office is represented by a card upon which is recorded, in a suitable code of wide and narrow notches, the office identity and the route for reaching the office as determined by the selective combination of conductors for operating the switching control register of the sender according to the setting necessary to reach the office designated by the card. The cards are held in a stacked relation within a suitable structure, the wide and narrow notches form grooves that traverse the stack, the different cards may be selected by a combination of "select" bars inserted by electromagnetic devices responsive to the setting of the dial registers into those grooves in the stack which are made by the code notches indicating office identities, and the required conductors of the combination necessary for operating the switching control register of the sender to reach the office are then activated by other bars inserted into certain selected grooves made by the route notches in the different cards, including the selected card.

My invention will be better understood from the detailed description thereof which follows, taken in connection with the appended claims and accompanying drawings, in which:

Fig. 1 shows a front elevation of one form of the translator;

Fig. 4 shows a diagrammatic perspective of the card arrangement, indicating the stacked position of the cards in relation to the select and output bars disposed over and under the grooves formed by the select and reading codes, respectively; while Fig. 5 shows a schematic arrangement illustrating the application of the translator as a decoder for automatic telephone switching.

Figure 2:
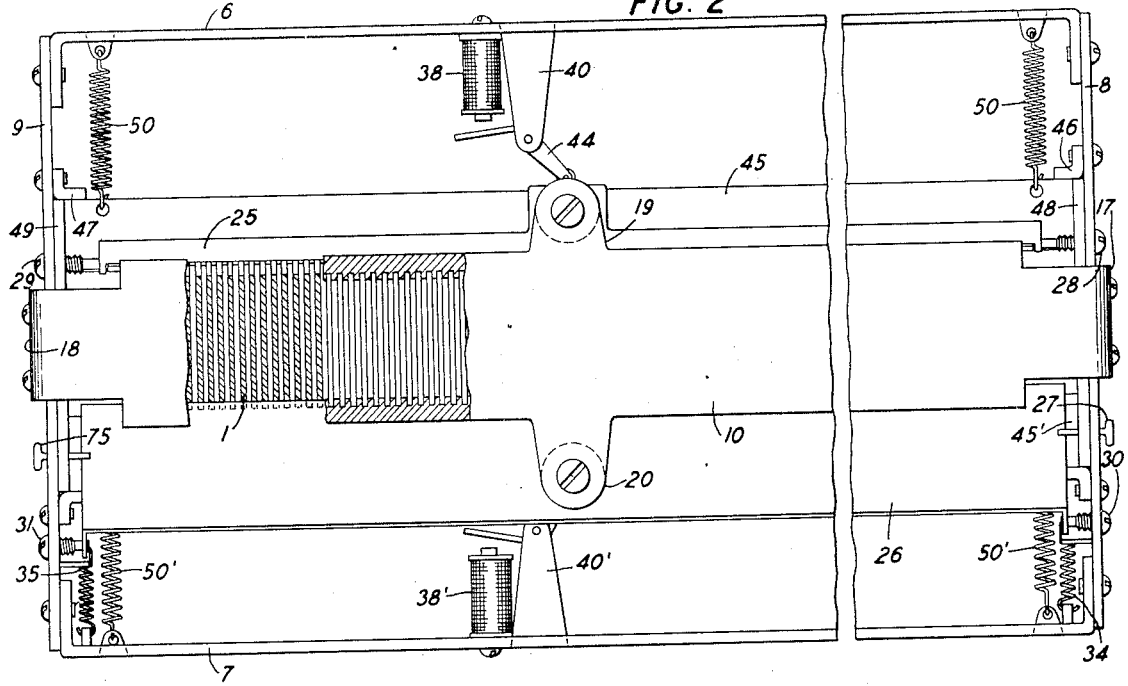
Fig. 2 shows a side elevation of the structure in Fig. 1 as viewed from the left of said figure along line 2—2, certain parts being cut away to show the interior arrangement of parts.

Before proceeding with a detailed description of the embodiment of the invention herein disclosed and described by way of illustration, I will discuss, in general terms, its fundamental structure, including one proposed form of code by which the different cards are to be identified for selection purposes and by which the information specific to each of the cards is to be recorded thereon. Although I have broadly termed the translating unit a "card," I propose that each "card" should be a long narrow strip of very thin metal each corresponding to an "entry" to which the output information of the card is correlated. For example, the entry strips, or cards, may consist of 10-inch lengths of steel ribbon ½ inch wide and .010 inch thick, and on each entry strip is recorded the input (identity of the card) and output information (the information specific to the card) by means of coded combinations of wide and narrow notches indenting the edges of the strip. The code of wide and narrow notches by which the input and output information is thus to be recorded on the different strips may be of any suitable kind, but I prefer a code composed of the "binary" representations of different numbers assigned to represent, respectively, the input and output information, as being the simplest and most convenient for the variety of uses to which the translator may be put.

As is well known, any number may be represented by its equivalent in binary digits; that is, by the sum of the products of certain indicated powers of the digit 2, and a binary code to represent the number may be made up by the serial arrangement of two characters, one indicating those products of the powers of 2 which are to be included in the summation and the other indicating those products of the powers of 2 which are to be ignored. Thus, if we assume the digit 1 to represent the former products and the digit 0 the latter products, the eleven digits 0 to 10 of the decimal system may be expressed as follows in their binary form:

| Digit | Binary representation of the digit | | | |
| --- | --- | --- | --- | --- |
| | $2^3$ | $2^2$ | $2^1$ | $2^0$ |
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 10 | 1 | 0 | 1 | 0 |

It will be seen from the above table that any number is equal to the sum of the products of the digit 2 raised to the power indicated in each of the binary places designated by the digit 1. In the same manner, any number may be expressed by its binary equivalent as, for example, the number 438 which may be expressed as follows in the binary form:

| Number | $2^9$ | $2^8$ | $2^7$ | $2^6$ | $2^5$ | $2^4$ | $2^3$ | $2^2$ | $2^1$ | $2^0$ |
| --- | --- | --- | --- | --- | --- | --- | --- | --- | --- | --- |
| 438 | 0 | 1 | 1 | 0 | 1 | 1 | 0 | 1 | 1 | 0 |

In my invention, the input information on a card consists of the binary representation of a number, the output information consists of the binary representation of another number and the two numbers may or may not be mathematically correlated depending upon the use to which the translator is applied. Where the translator is used as a mathematical table such as a table of square roots, for example, the input and the output numbers would be correlated by the fact that the output is the square root of the input. On the other hand, where the translator is used as a mechanical directory, for example, the decoder hereinbefore discussed, the input would consist of the binary representation of the number that designates the office code while the output would consist of the binary representation of some other number that designates the selective setting of the switching control register. In either event, the input and output numbers are recorded on the card by their corresponding binary representations, such representations being entered along the edges of the card by a series of paired wide and narrow notches, one arrangement of a pair of such notches designating the binary digit 0 and the opposite arrangement designating the binary digit 1, it being understood that there will be as many pairs of these notches for each number on the card as there are binary places to which the binary representation of the numbers is carried, this latter requirement being essential to a code having an equal number of notch pairs for variable digit numbers.

We may now assume that the binary digit 0 may be indicated by a narrow notch on the upper edge of the entry strip and a wide notch double the width of the narrow notch on the lower edge, that the binary digit 1 may be represented by a wide notch on the upper edge and an oppositely disposed narrow notch on the lower edge, the notches for both digits being oppositely disposed with their right edges in alignment when the strips are stacked in the same sense. The binary representation of an input number, therefore, would be entered along two edges of the card, say towards the left end, by as many pairs of upper and lower notches as there are binary digits for the number, including additional pairs of notches for each additional binary digit 0 that must be added to make the code uniform for all numbers. In the same way, the binary representation of the output number may be entered along the upper and lower edges, say towards the right end of the card, by as many pairs of upper and lower notches as there are binary digits for the number, having due regard for the fact that, in both cases, a narrow notch on the top edge and an oppositely disposed wide notch on the bottom edge designate the binary digit 0, while the converse arrangement designates the binary digit 1, and that with the notches of the output number as with the notches of the input number, the notches must be oppositely disposed with their right edges in alignment.

With these assumptions, we may proceed to conceive a typical entry strip of my invention. Let it be assumed that some item of information, say the code of a telephone office, is to be arbitrarily represented by the number 438, and that the number which indicates the required selective operation of the switching control register is 28975. Assume that N stands for a narrow notch, W stands for a wide notch and that the notches are paired and oppositely disposed along the edges of the card as above indicated to represent the binary digits 0 and 1, respectively. The arrangement of notches along the two edges of the card to represent the binary of the two numbers will then be as follows, the binary digit indicated being in the middle of the paired notches:

Input number=438

Binary of the input number = $\begin{matrix} N & W & W & N & W & W & N & W & W & N \\ 0 & 1 & 1 & 0 & 1 & 1 & 0 & 1 & 1 & 0 \\ W & N & N & W & N & N & W & N & N & W \end{matrix}$ Output number=28975

Binary of the output number $= \begin{matrix} N & N & W & W & W & N & N & W & W & N & N & W & N & W & W & W & W \\ 0 & 0 & 1 & 1 & 1 & 0 & 0 & 1 & 1 & 0 & 0 & 1 & 0 & 1 & 1 & 1 & 1 \\ W & W & N & N & N & W & W & N & N & W & W & N & W & N & N & N & N \end{matrix}$ Now if we further assume that each item of input information will be designated on an individual card by the binary representation of a three-digit number, as would be the case for the codes of telephone offices, for example, and that the corresponding output information will be designated on the card by the binary representation of a five-digit number, it is obvious that each "input" entry will be recorded on a card by ten pairs of notches and that each "output" entry will be recorded by seventeen pairs of notches. If all the cards are identical in dimensions and the notches thereon are identically spaced, said cards, if stacked together in the same sense, will form as many grooves of varying widths as there are notches, the variety in the width of the different grooves being due to the wide and narrow notches. Moreover, since each binary digit is designated by a pair of notches along the upper and lower edge of a card, it is clear that if a bar slightly narrower than the width of a narrow notch is provided for each groove formed by the input notches when the cards are stacked and such bars are inserted only in those grooves which are indicated by the wide input notches of a particular card, all the cards in the stack will be locked against movement except the card which has the indicated wide notches, which card will then be free to move out of the stack by the difference between a wide and narrow notch. Accordingly, if each card is arranged to be acted upon sideways by an applied force such as a spring or an electromagnet, for example, the card having the indicated wide notches will then move in the direction of the applied force until the edges of the wide notches are stopped by the side of the inserted bar. Whence it follows that if a group of cards notched as above are arranged in a stack, and each card is provided with a spring or an electromagnet to pull it out of the stack, any card may be "selected" by inserting bars in those input grooves of the stack which are indicated by the wide input notches on the card to be selected, said selection being physically manifested by the card itself being withdrawn out of the stack by a distance equal to the difference between a wide and narrow notch.

Figure 4:
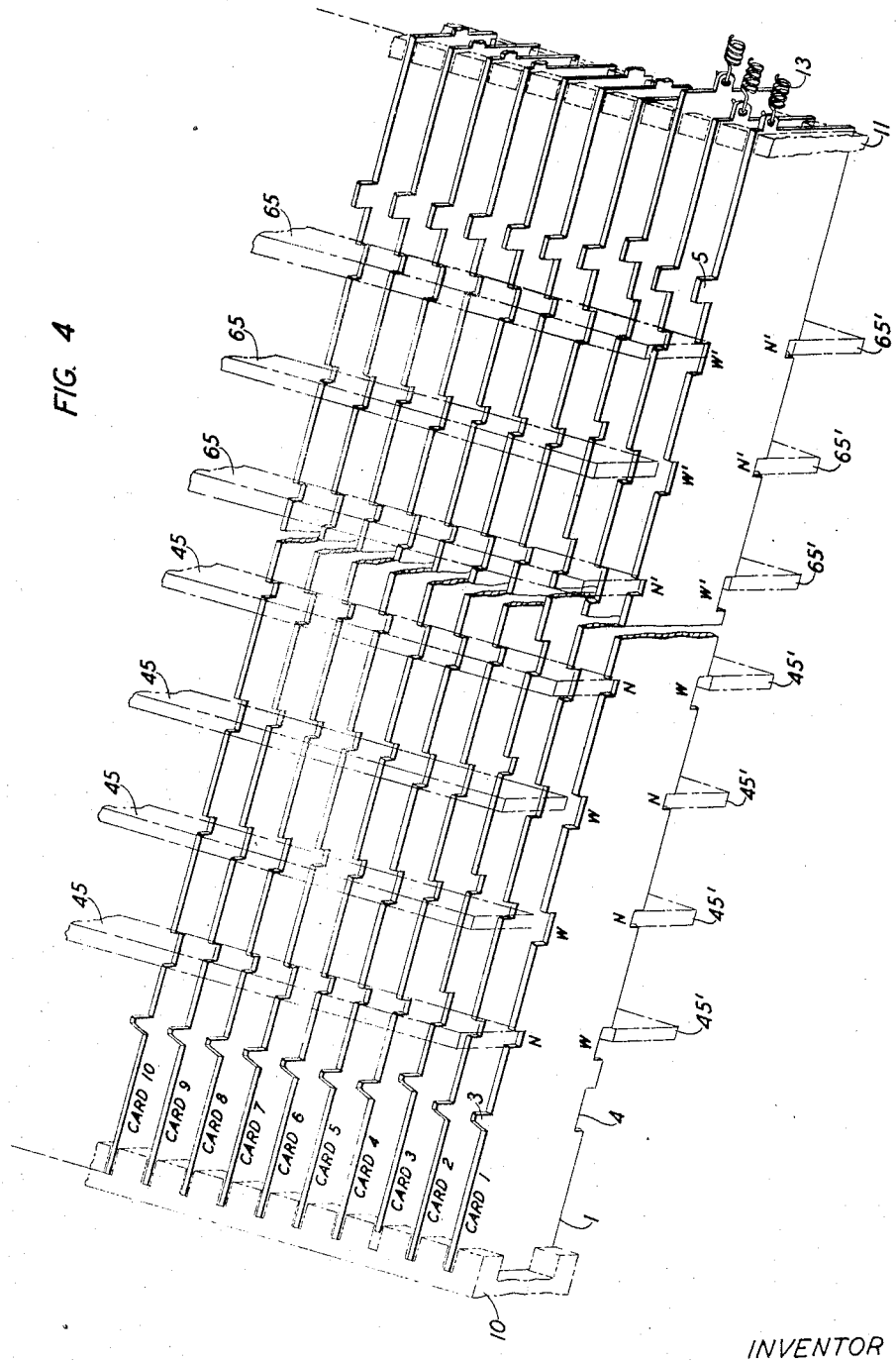

The above principle of selection is clearly demonstrated in Fig. 4 which shows ten cards of a group arranged in stacked relation, each card being notched to the left of the broken section of the stack according to the four binary digits of a single number individual to the card, the first card 1 (the first forward card) being notched for the digit 6, the second card for the digit 3, the third card for the digit 9, the fourth card for the digit 2, the fifth card for the digit 7, the sixth card for the digit 1, the seventh card for the digit 8, the eighth card for the digit 4, the ninth card for the digit 5 and the tenth card for the digit 10. It is indicated in the drawing that card 3 is selected and it will be seen that this card has a first and fourth wide notch W along the left upper edge (indicating binary digits 1) and, of necessity, a second and third wide notch along the lower edge (not shown), indicating binary digit 0. Hence to select this card the two select bars 45 over the top grooves indicated by the two wide notches W and the two select bars 45' under the two lower grooves indicated by the two lower notches W of the card 3 are fully intruded into the associated grooves. It will be seen that each inserted bar, when fully intruded into a groove, will lock every card which has one of its narrow notches N forming part of that groove, all cards excepting card 3 having such a notch at least in one of the grooves. Card 3, having but wide notches in the grooves engaged by the bars is not so locked, it being left free to move to the right out of the card guides 10 and 11 when pulled in this direction by the force of spring 13 attached to the right end of the card, a similar spring 13 being provided for each of the other cards.

Furthermore, and as above indicated, the notches which, on the different cards, designate the binary digits of the output numbers likewise form grooves of varying widths. Now when a card, through the selection operation above indicated, is moved out of the stack by the difference between a wide and a narrow notch, the output narrow notches N' on the cards in front and in back of the selected card will be "covered up" by the unnotched portion on the selected card that follows the covering narrow notch, but will remain unaffected by the uncut portions of the selected card that follow the wide notches W' thereon. The reason for this is the fact that the notches are all aligned with respect to their right edges, and since a wide notch W' is twice the width of a narrow notch N', the movement of a wide notch W' relative to stationary but oppositely disposed narrow notches N' can only have the result of reducing the effective width of the wide notch W' to the width of a narrow notch N'. In the same way, since all the narrow notches are of equal width, the movement of a narrow notch between two other stationary ones on opposite sides thereof will result in moving the blank or unnotched portion of the card in the space formerly occupied by the narrow notch. In other words, the displaced card blocks those output grooves which are indicated by its narrow notches N' but does not block those grooves which are indicated by its wide notches W', said latter grooves, at the place where displacement has occurred, being only reduced to the widths of narrow notches. If an attempt is now made to insert "output" bars 65 and 65' in all of the output grooves, each of said bars being, of course, slightly narrower than the width of a narrow notch N', it is obvious that only those bars will get through which are located above and below the grooves that include only the wide notches of the selected card as shown, for example, by the output bars 65 for the first and third top grooves indicated by the top wide notches W' of card 3 to the right of the section and by bars 65' for the second or middle groove (not shown) marked by the lower wide notch of this card to the right of the section. Since each card will have a different output number and, therefore, a different binary representation thereof indicated by an individual combination of paired wide and narrow notches, it follows that each card, when selected, will cause a different combination of output bars to become intruded into output grooves correlated thereto. These bars, when fully intruded, may be made to close separate pairs of contacts through which work circuits indicative of the output information may be completed, there being a different combination of such work circuits for each card selected.

Figure 3:
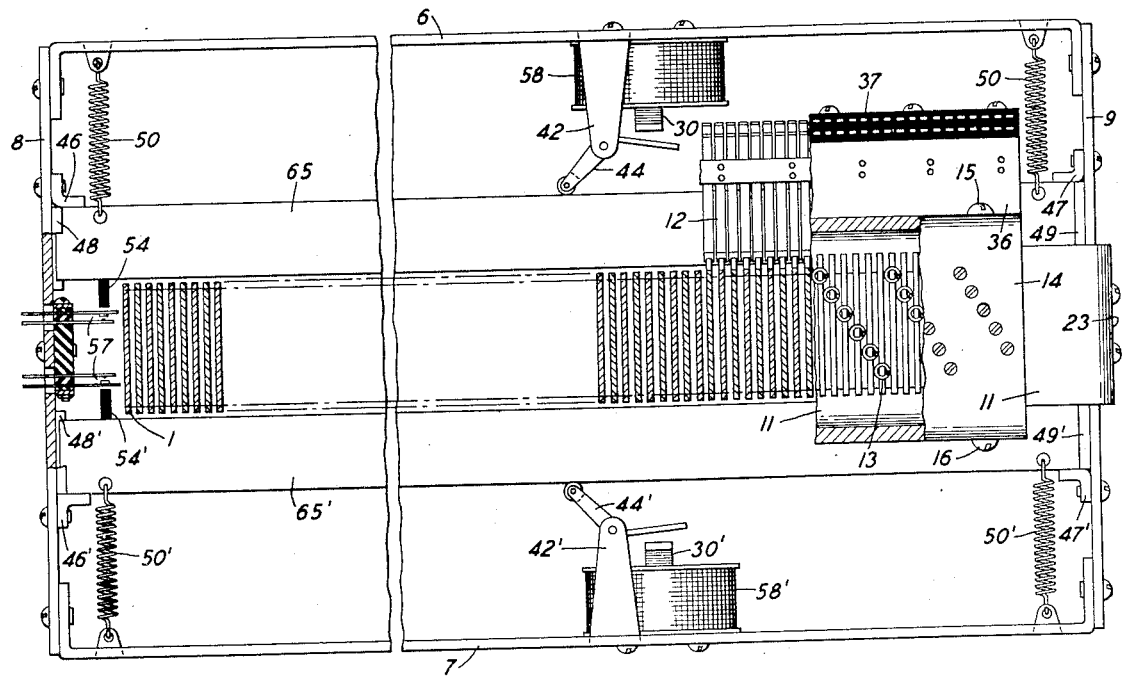
Fig. 3 shows a side view of the structure in Fig. 1 as viewed from the right of said figure along line 3—3, certain parts being cut away to show the interior arrangement of parts.

Referring now to Figs. 1, 2 and 3 of the drawings, which show one specific structure embodying the principles of the invention as above outlined, a card, designated by the reference numeral 1 and shown as the first or front card of a stack in Fig. 1 (the same order card being indicated by the numeral 1 in Fig. 3), is a long metallic member, rectangular in form, notched as shown to the left of division line 2 along the upper and lower edges thereof with the wide and narrow notches W and N, respectively, of the binary representation of the input number, and notched on the right side of said division line along its upper and lower edges with the wide and narrow notches W' and N', respectively, of the corresponding binary representation of the output number. Each strip or card 1 is, of course, made up of the same number of notches along its two edges since it is assumed that all input and output entries on each card will be designated by an equal number of binary digits. As shown in Fig. 1, the structure of the translator is broken in four places to indicate omitted portions which are contiguous to and identical with the parts shown on either side of said omitted portions. Since the length of the cards depends upon the total binary digits for the input and output numbers entered thereon, and upon whether the paired notches for each binary digit are entered along the two edges of the card or along one edge only, the length of the translator is necessarily controlled by the length of the cards. Therefore, the better to visualize the unitary apparatus, certain portions thereof which are the same as those shown, have been removed. For example, if the input number for each card is a three-digit number and the corresponding output number is a five-digit number, each card will have to be long enough to provide for twenty-seven pairs of notches, equally divided between the top and bottom edges, with ten pairs of notches reserved for the input number and seventeen for the output number. If the paired notches are entered along one edge only, or if the output and input numbers exceed the numbers above suggested by way of illustration, then the cards will, of course, have to be longer and the supporting apparatus will have to be larger.

For the purpose of resetting the cards and for certain other control purposes as hereinafter set forth, each card, besides being indented with the wide and narrow notches of the input and output record, is provided with a right triangular latch portion 3 on the left top edge, a rectangular recess 4 on the left bottom edge and a rectangular stud 5 on the right top edge. When the cards are stacked in the same sense with the input notches N—W on the left and the output notches N'—W' on the right as shown in Figs. 1 and 4 and as hereinafter described, the latch portions 3 will be arrayed to form a right-angled prism, the recesses 4 a rectangular groove, and the studs 5 a rectangular block, all coextensive, of course, with the depth of the card stack.

The translator structure; that is, the apparatus which holds and selects the cards and provides the signals indicative of the output number recorded by the notches N'—W' on a selected card, comprises an open end box-like unit having the upper and lower channel plates 6 and 7 secured, respectively, to the front and rear plates 8 and 9. Embracing the left ends of the plates 8 and 9 substantially in the middle thereof is the left card guide 10 which is a vertically slotted channel member closed at the top, bottom and rear to form equally dimensioned slots or compartments which are slightly longer and wider than the width and thickness of the cards, respectively, each compartment being open-ended looking into the structure, there being as many such compartments as there are cards to be accommodated. The guide 10 is secured to the plates by means of its right-angled portions 17 and 18 which have threaded openings to support holding screws that pass through corresponding openings in the plates. The guide is provided with oppositely disposed ears 19 and 20 to support magnets 21 and 22 as hereinafter set forth.

Embracing the right ends of the plates 8 and 9 is the right card guide 11 which is a vertically slotted member having open sides, there being as many slots or compartments as there are cards to be accommodated. These compartments correspond in number and dimensions to those in the left card guide 10 and are similarly spaced. The right guide 11 is so positioned at the right end of the plates 8 and 9 that the compartments thereof are in substantial alignment with those of the left card guide 10 so that a card slipped through a compartment in the right guide will have a registering accommodation in a corresponding compartment in the left card guide 10, said card being driven "home" until its left edge engages the enclosing side of the left guide 10. As with the left card guide 10, the right card guide 11 is similarly secured to the plates by screws passing through threaded openings in the right-angled portions 23 and 24 (the latter not shown) and into corresponding threaded openings in the two plates.

The front plate 8 has been partially cut away, in Fig. 1, to expose to view the cards 1 supported by the two card guides 10 and 11 and to show the apparatus interiorly secured to the upper and lower channel plates 6 and 7. In Fig. 2, the left card guide 10 has been partially cut away to show the arrangement of the cards at left end while in Fig. 3 the right card guide 11 has been partially cut away in steps to show the similar arrangement of the cards at right end, the individual contact springs 12 and the individual card-pulling springs 13 both of which are supported by a spring carrier 14 secured to the right card guide 11 as hereinafter set forth. It has already been noted that the length of the translator unit is governed by the length of the cards which, of necessity, determines the length of the front and rear plates 8 and 9. In a similar manner, the length of the card guides 10 and 11 is likewise contingent upon the number of cards that the unit must hold. It is understood, therefore, that, with respect to the size of the unit, the length of the cards and their number will control its size.

Oppositely disposed in the middle of the left guide 10 are the apertured supporting ears 19 and 20 upon which are mounted the latch magnet 21 and the reset magnet 22, respectively. As will be explained hereinafter, the armature 25 of the latch magnet 21 is used to lock the cards in their normal position while the armature 26 of magnet 22 is used to reset a selected card. However, it may here be stated that the armature 25 is formed of two right-angled portions pivotally supported on the plates 8 and 9 by the screws 28 and 29, the horizontal portion of said portion being slightly longer than the number of compartments and having the outer end thereof made as a catch to engage the latch apex of portions 3 of the cards. The armature 26 is rectangular in shape, is also slightly longer than the number of compartments and is also pivotally supported between the plates 8 and 9 by the screws 31 and 30, respectively. Spring arms 32 and 33 (the latter not shown) are provided at the ends of the armature, and springs 34 and 35, which are anchored to the bottom plate 7, are secured to the arms to cause them to exert a force that will turn the armature in a clockwise direction. Normally, however, the movement of the armature is restricted by the shank of the pins 27 and 75 which are inserted in the plates 8 and 9, respectively, through aligned perforations therein. Now armature 26 is made sufficiently wide so as to cause its top edge to come within the groove 4 made by the stacked cards as hereinafter set forth, and the pins 27 and 75 are so located upon the plates that the top edge of the armature clears the left edge of the groove by slightly more than the width of a narrow card notch N. When a card is selected and the same is drawn out of the stack as above described in connection with the general principle of the invention and as described below for the specific embodiment thereof as covered by this specification by way of example, the left edge of the recess 4 of the selected card will engage a portion of the top edge of the armature 26. To draw the selected card back into the stack, magnet 22 is energized, whereupon armature 26 is caused to move counter-clockwise against the tension of the springs 34 and 35 by the magnetic attraction and pushes the card back into the stack.

It is now apparent how the various cards of the translator unit may be placed therein. Spring carrier 14 which is secured to the right guide 11 is removed therefrom by withdrawing the screws 15 and 16 (of which only two are shown in Fig. 3). Pins 27 and 75 are also withdrawn, thereby causing armature 26 to be pulled down by the springs 34 and 35 until its upper edge clears the recess 4, formed by the cards when they are stacked. Each card is then inserted in its appropriate compartment (depending upon the order or sequence in which the cards are arranged) through the exposed right end of guide 11, whence it is carried through into the corresponding compartment in guide 10 until the left edge of the card abuts against the rear of said guide 10. It would be desirable when thus assembling the cards in the unit to have magnet 21 energized in order to lift the armature 25 out of the path of the latch portions 3 of each card as the latter is driven home in the left guide compartment. However, if the magnet is not energized, the round end of the catch formed at the end of the armature will be lifted by the inclined part of the latch and then drop of its own weight on the other side of the latch 3 of the card, thus locking the card. The cards are provided with apertured lugs at their extreme right end, the cards being made long enough to insure that the lugs come outside of the right guide compartments. These lugs, of course, are preferably staggered, for various cards. After the cards are all inserted in the unit as above set forth, magnet 22 is energized to draw armature 26 into the groove 4. With the armature in this position, pins 27 and 75 are inserted and, thereafter, magnet 22 is released thus allowing armature 22 to fall back upon the pins. The spring carrier 14 is now secured to the guide 11, and the springs 13, of which one is provided for each card, are hooked to the lugs thereof. These springs are normally under tension when the cards are in place. That is, when their respective latch portions 3 have been secured beyond the catch of armature 25, the tension is such that, if magnet 21 is energized and armature 25 lifted to clear the latches 3, all of the cards would be pulled out of the stack by an amount determined by the tension in the springs. Thus when all the cards are inserted in the compartments provided therefor in guide members 10 and 11, they will appear in stacked relationship, their respective latch portions 3, the recesses 4 and studs 5 being arrayed in back of each other for the purpose above set forth, while the input notches N—W and the output notches N'—W' are likewise arrayed to form grooves having aligned right edges and of a width varying from that of a narrow notch N or N' to that of a wide notch W or W'.

To remove one or more cards, the latch magnet 21 is energized, pins 27 and 75 are pulled out, the springs 13 are disconnected from the card lugs and the spring-carrier 14 is detached from the card guide 11. The energized latch magnet 21 causes the armature 25 to clear the latch portions 3, the removal of the pins 27 and 75 causes armature 26 to clear the groove 4 while the detachment of the spring-carrier 14 clears the right entry of the compartments in card guide 11. The desired cards may now be withdrawn out of the unit by pulling them out of their respective compartments in guides 10 and 11, and they may be replaced by other cards by inserting the latter into the vacant compartments, making sure the meanwhile that each card is fully intruded in the compartment of the left card guide 10 until the edge of the card abuts against the rear of the guide. Magnet 21 is then released to drop the armature 25 on the right side of latches 3, magnet 22 is energized to pull the armature 26 within the groove 4 before replacing the pins 27 and 75 and the spring carrier 14 is secured to the guide 11 in the manner above set forth.

It will be noted that the spring carrier 14 has a vertical rectangular portion 36. Upon this is mounted a spring block 37 containing, for each card, a pair of contact springs 12, the springs of each pair being insulated from each other and from the springs of adjacent pairs. The spring pairs 12 are horizontally so spaced that the outer spring of each set is to the left of and in engagement with the left edge of the lug 5 of the associated card, the horizontal portion of the outer spring being dimensioned to insure that when the cards are stacked within the unit as above set forth the outer outer spring of the pair individual to a card will be pushed slightly to the left so as to be out of engagement with the inner spring. It is apparent from Fig. 1 that when, upon selection, a card is moved to the right, the tension thus built in the outer spring will cause it to move the spring to the right and thereby engage the inner spring of the pair to establish an electrical contact therethrough. As shown in Figs. 1 and 3, the springs 12 terminate in wiring lugs to the right of the block 37, and to these lugs conductors may be connected through which an individual circuit for each card when selected may be completed if desired. It is further evident from Fig. 1 that since the springs 12 are assembled upon and wired to the spring carrier 14 as a unit, the removal of the carrier for the purpose of inserting or replacing the cards as above set forth will not disturb the wiring arrangement. Obviously, if the translator is to be used in operations that do not require a circuit for each card to indicate when the card has been selected or for other purposes, the spring block 37 may be dispensed with and the vertical portion 36 need not be provided, the spring carrier 14, in such circumstances, being simply a U-shaped channel threaded along its base to mount the screws for the springs 13, and threaded along its two sides to mount the holding screws 15 and 16.

Centrally disposed along the underside of the upper plate 6 are the select magnets 38 of which one is provided for and over each top groove formed by the upper notches N—W of the input numbers on each of the cards. Centrally disposed upon the upside of the lower plate 7 are an equal number of select magnets 38' of which one is provided for and under each lower groove formed by the input notches N—W of said numbers on each of the cards, it being understood that there are as many lower input grooves as there are upper input grooves because of the opposite disposition of the paired notches that designate the binary digits. Secured to the underside of plate 6 in front of the magnets 38 are the three aligned supports 40, 41 and 42, support 40 being located to the left of the first select magnet 38, support 41 to the left of the last select magnet 38 and support 42 to the right of the last spring 50, said spring being one of a number serving a purpose to be shortly described. To the top side of plate 7 in front of magnets 38' there are likewise three other aligned supports 40', 41' and 42' oppositely disposed to the corresponding supports located on plate 6. Each set of said supports has aligned apertures through which is keyed a shaft 43 and 43', respectively. Upon the shaft 43 is mounted a bell crank armature 44 for each select magnet 38 and upon shaft 43' is mounted a bell crank armature 44' for each select magnet 38'. Each armature includes an arm which carries a roller at the end thereof, and the armatures are so disposed upon their respective shafts 43 and 43' that each roller comes over (or under) an input groove.

Positioned over each upper input groove is a rectangular "bar" 45 and positioned under each lower input groove is an identical bar 45'. Each of said bars has a thickness slightly less than the width of a narrow notch N or N' such that, when the bars 45 are abutting against the underside of the rests 46 and 47, the latter being secured, respectively, to the plates 8 and 9 and are coextensive in length to the total number of the top grooves, the lower edges of said bars just clear the top edge of the cards and the rollers on the different armatures 44 will rest upon the top edges of the associated cards. In the same manner but in opposite disposition thereto, when the bars 45' are resting on the top of the two angle members 46' and 47', the latter being secured, respectively, to the plates 8 and 9 and are coextensive to the total number of lower grooves, the upper edges of said bars just clear the lower edges of the cards and the rollers on the different armatures 44 will engage the lower edges of the cards. The edges of the bars 45 are slidably fitted in oppositely aligned slots of the two upper bar guides 48 and 49 which are two rectangular slotted members of a length sufficient to provide a guide slot for each upper bar in the translator and are internally secured in oppositely aligned relation to the side plates 8 and 9. In the same manner, the edges of the lower bars 45' are slidably fitted in oppositely aligned slots of the two lower bar guides 48' and 49' which are also two rectangular slotted members of a length sufficient to provide a guide slot for each bar in the translator. These two guides are internally secured in oppositely aligned relation to the side plates 8 and 9 but, unlike the upper bar guides 48 and 49 which are disposed underneath the upper channel rests 46 and 47, they (that is, the guides 48' and 49') are disposed on top of the lower channel rests 46' and 47'.

Each end of an upper bar 45 is connected to one end of a retaining spring 50, there being a pair of such springs for each bar, the other ends of each of said springs being secured to the underside of plate 6. Each end of a lower bar 45' is likewise secured to one end of a similar spring 50, the other ends of each of said springs being secured to the top side of plate 7. The springs 50 (in pairs connected to each bar) are designed normally to exert a pull upon each of the bars to which they are attached, which pull acts to keep the upper bars 45 against the channel rests 46 and 47 and the lower bars 45' upon the channel rests 46' and 47'. Now when an upper select magnet 38 is energized, its armature 44 is rotated clockwise and the roller upon the crank portion thereof depresses the associated bar 45 down into the groove thereunder thereby increasing the upward pull of the two springs 50 attached to the bar. When the magnet is deenergized, these springs pull the bar out of the groove and back against the lower surface of the rests 46 and 47, the residual tension in the springs being sufficient to hold the bar thereagainst. Also, when a lower select magnet 38' is energized, its armature 44' is rotated counter-clockwise and the roller upon the crank portion thereof pushes the associated bar 45' up into the groove thereover and increases the tension upon the pair of retaining springs. When the magnet is deenergized, the springs pull the bar out of the groove and onto the channel rests 46' and 47'.

It is now clear from the foregoing description of the arrangement of the select bars 45 and 45' over the upper and under lower input grooves, respectively, made by the card stack, that when the select magnets 38 and 38' are energized, their separately controlled bars 45 and 45' are caused to be intruded into the grooves with which each of the bars is respectively associated, and that when said magnets are released, the bars are withdrawn from the grooves by the springs 50 clear of the edges of the cards up against the rests 46 and 47, for the bars 45, and down upon the rests 46' and 47' for the bars 45'.

The output grooves formed by the notches N'—W' are also provided with bars 65 and 65' which are identical in dimension to the bars 45 and 45', are similarly positioned over the upper and under the lower groves, respectively, and are slidably fitted into aligned slots in guide plates 48, 49 and 48', 49', respectively. The bars 65 and 65' are also similarly suspended out of their respective grooves by the springs 50 which normally hold the bars against the rests 46, 47 and 46', 47' as previously set forth for the bars 45 and 45'. Each upper bar 65 is, however, provided with a stud 54 at its lower front edge directly in front of the first card in the stacked array, while each bar 65' is provided with a stud 54' at its upper front edge directly in front of the first card.

It will be observed that the front plate 8 is formed with two rectangular outlets 55 and 55' which run the entire length of the output grooves below and above the top and bottom edges, respectively, of the card field. A block containing an upper and lower array of paired contact springs 57 is secured between the two outlets. There is an equal number of such spring pairs in each array with the number equal to the number of bars 65 and 65'. The spring pairs are so disposed in spaced relation that each pair 57 in the upper array comes directly under stud 54 of an upper bar and each pair in the lower array is directly over a stud 54' of a lower bar, there being, as said before, one pair of springs for each bar. The springs are long, flexible and terminal-ended in the portions which lie outside of an outlet for the connection of electrical conductors thereto. When an output bar becomes fully intruded into its associated groove in the manner shortly to be described, the stud 54 (or 54') engages one of the springs and presses it against the other, the two springs remaining in contact as long as the bar remains fully intruded within the groove.

The upper output bars 65 are intruded into their respective groves by means controlled by the magnet 58 while the lower output bars 65' are similarly intruded into their own respective groves by similar means controlled by the magnet 58'.

It will be recalled that the shaft 43 extends to the support 42 affixed to the top plate 6. This shaft, in addition to carrying the bell crank armatures 44 of the various select magnets 38, also carries, between supports 41 and 42, a similar bell crank armature for each groove formed by the upper output notches N'—W', which armature is so disposed upon the shaft that the roller thereof is in substantial vertical alignment with the groove and rests upon the top edge of a bar 65. In a similar manner, the lower shaft 43' carries, between supports 41' and 42', a bell crank armature 44' for each groove formed by the lower output notches N'—W', each of said armatures being so disposed upon the shaft that the rollers are directly underneath their corresponding grooves and rest upon the lower edges of the bars 65'.

As with the case of the bars 45 and 45', the bars 65 and 65' are provided with retaining springs 50 which normally hold the bars against the rests 46, 47 and 46', 47', respectively, so that when the armatures operate in the manner shortly to be described, the bars are intruded into their respective grooves against the tension of the springs which, when the armatures release, draw the bars out of the grooves back against the rests.

The magnet 58 is secured to the underside of plate 6 midway between the line-up of bell crank armatures located between the supports 41 and 42, and along a longitudinal line of the plate which will insure that the magnetic portion of each armature will be centered with respect to the longitudinal dimension of pole-piece 30 of the magnet. This pole-piece which is uniform in width, extends in length on either side of the core of magnet 58 to include the first bell crank armature to the right of the support 41 and the last armature to the left of support 42. To insure uniform magnetic reluctance, the pole-piece is thickest at the core, gradually tapering on either side thereof to a minimum thickness at its ends. Now when the magnet 58 is energized, all of the bell crank armatures underneath the pole-piece 30, which is to say, all the upper output armatures, are attracted and the rollers thereof depress their respective bars 65 into their associated grooves formed by the card stack. Upon the release of the magnet, the springs 50 withdraw the bars from their respective grooves to their position of rest against the rest members 46 and 47. If desired, the single magnet structure 58 may be replaced by individual magnets, one for each bar as, for example, the magnets 38 used for the select bars 45. In this case, however, it will be necessary to operate all of the individual magnets upon each translating operation inasmuch as translation, as described hereinafter, depends upon attempting to intrude all the output bars into their respective grooves after a particular card has been selected.

Magnet 58' which is identical in construction to magnet 58 is disposed upon the lower plate 7 and, like magnet 58, controls the operation of the bell crank armatures 44' for the purpose of inserting the bars 65' into the lower output grooves. The arrangement of the lower bars 65' and the controlling armatures therefor are symmetrical with and identical to the arrangement for the upper bars 65 and armatures therefor and need not be here amplified in view of the obviousness of the arrangement from an inspection of Figs. 1 and 3.

The operation of the translator, the manner in which a card is selected and the manner in which the output notches thereon are used in connection with the output or "reading" bars 65 and 65' and the output grooves formed by the card stack, to indicate the output information upon the selected card, will now be described.

Assume all the cards to have fully inserted within the containing apparatus as above described, that is, with the latch portion 3 of each card to the left of the catch on armature 25. To select any particular card from the stack, the select magnets 38 and 38' are operated in the combination determined by the number of wide input notches W of the card to be selected. The operation of the magnets 38 and 38' causes their associated select bars 45 and 45' to be intruded into their associated input grooves of which the wide notches W of the card to be selected form a part. Since the width of each bar is slightly less than the width of a narrow notch N, it is evident that the intruded bars will engage a narrow notch N on one or more cards in one or more grooves engaged by the bars except the card to be selected whose wide notches W have determined the combination of select magnets 38 and 38' to be operated. For this card, the bars, passing through the wide notches W thereof, leave a clearance space equal to the width of a narrow notch N since it has been assumed that a wide notch W is twice the width of a narrow notch N. If the card to be selected were free to move to the right, said card would be pulled in that direction by its spring 13 until the left edges of its wide notches W would be stopped by the left surfaces of the intruded bars. Now in order to provide this movement, latch magnet 21 is operated after the required combination of select magnets 38 and 38' is operated. The operation of magnet 21 lifts the armature 25 clear of the latch portions 3 on all the cards, and since the cards whose narrow notches N are engaged by the intruded bars are locked against movement by the fact that the bars occupy the entire width of the narrow notches, it follows that the only card that will be free to move is the card to be selected in which such clearance is present, that is, the card into whose wide notches W the bars have been intruded. The spring 13 of this card now pulls the card out a distance to the right equal to the difference between a wide notch W and a narrow notch N.

Now if we examine the output grooves which are formed by the notches N'—W' for the output the information, it will be observed that when a card 1 is moved out of the stack in the manner above described, the "narrow" grooves will be blocked where the selected card has narrow notches N' but will be clear if the corresponding notches in the selected strip are wide. Hence if, after a card is moved outward, magnets 58 and 58' are operated, only those bars 65 and 65' will be intruded into their corresponding grooves as are kept clear by the wide notches W' of the selected card. These bars, when they are intruded into the grooves, will cause their respective studs 54 and 54' to press together the springs 57 a pair of which, as previously described, is positioned below and above each stud. These springs, upon closing, complete electric circuits equal to the number of wide notches W' on the output side of the selected card. It is obvious that since the combination of wide notches W' is different for each card, the combination of output circuits completed with each card selection will likewise be different. These different circuits may then be utilized in accordance with the use to which the translator is put. As shown in the figures, each card, when moving out, closes its own pair of auxiliary contacts 12 which may be used for supervisory control purposes as above set forth. Where no such control is necessary, the contacts may be eliminated and the projection 5 on each card can be removed.

To restore the selected card back into the card stack, magnets 58 and 58' are first released to withdraw the output bars 65 and 65' out of the output grooves. Reset magnet 22 is then operated, whereupon its armature 26 engages the left edge of notch 4 on the selected card and thereby pushes the card to the left until the card is fully intruded within its compartment in the left guide 10. Latch magnet 21 is now released to cause the catch on armature 25 to engage the latch portion 3 on each of the cards thereby locking them against the pull of their respective springs 13. When the cards are locked, the select magnets 38 and 38' are released to cause the intruded input bars 45 and 45' to be withdrawn from their respective grooves, and magnet 22 is then released to cause its armature 26 to fall back upon the rest pins 27 and 28. The translator is now again ready for operation.

Having described the manner in which my translator operates, I will now briefly indicate how it may be applied in automatic telephone systems to "decode" the dialed office code into appropriate information which the sender can use to complete the connection, reference being had to Fig. 5 and to the above-mentioned Patent 1,862,549. As previously stated, this patent shows an automatic telephone system employing switches of the so-called panel type which are selectively positioned to reach the wanted line under the control of a register sender which is temporarily connected to the calling line. This sender fundamentally comprises a primary register which responds to the dial pulses, a group of dial registers which each connectable to the primary register in the required order to take the setting given to the primary register by a series of pulses, and a switching control register which is selectively set according to the route to be taken to reach the wanted office and the called subscriber therein. After the dial registers are set in accordance with the dialed office code the sender, through the medium of a connector, is automatically connected to a circuit known as a decoder. The decoder comprises, in turn, a register which is responsive to the dial registers, a "route" relay for every office that can be reached from the calling office and a relay network which is operated by each of the different route relays to selectively ground certain conductors leading back to the sender and connected therein to the relays of the switching control registers. Now when the sender is connected to the decoder, the dial registers thereof are connected to the registers of the decoder and the latter registers are then caused to take a setting corresponding to that of the dial registers, in consequence of which a circuit is completed to the route relay individual to the wanted office. The route relay, in operating, completes various circuits to the relay network and the latter selectively grounds the conductors to the sender in accordance with the interconnection between the route relay and the relay network, which interconnection is, of course, different for each route relay since the information required by the sender to complete the connection to each office will differ. The switching control register of the sender is then selectively operated by the grounded conductors and circuits controlled by this register are then operated to guide the various selectors of the selector train into the positions required to reach the wanted office and the subscriber therein.

It is proposed that the translator herein described and claimed can replace the decoder in the performance of its functions. In Fig. 5 is schematically shown the sender and the necessary registers. The translator is connected to the sender through the medium of a connector, the register of the decoder is replaced by the select magnets 38 and 38' of the translator, the route relay is replaced by a notched card individual to the office and the relay network is replaced by the output bars 65—65'. If it is assumed that all office codes are three-digit codes, these codes may then be represented by ten binary digits which necessitates the use of twenty select magnets, ten magnets 38 for the top edge of the cards and ten magnets 38' for the bottom edge. Each card is then selected by operating the magnets 38—38' by circuits (not shown) completed by the sender dial registers in the combination indicated by the wide notches of the office code on the card individual to the office. When the card moves out, output magnets 58 and 58' are operated in any suitable manner to cause the intrusion of bars 65—65' in the grooves indicated by the wide notches in the output side of the selected office card. The output information in each of the office cards is determined, of course, by the number of separate circuits required to selectively operate the switching control register of the sender. This information is represented by the binary of an N-digit number and the bars 65—65' are selectively operated subsequent to the selection of the required office card to ground the springs 57 and 57' individual to each output bar. The closure of the springs grounds conductors connected to relays of the switching control register, and since the selection of each card results in the closure of different combinations of spring pairs 57 and 57', it is obvious that the switching control register will be differently set for each office card selected. Once the switching control register is operated, the translator is disconnected from the sender in the manner disclosed in said patent for disconnecting the sender from the decoder and the translator is then available for the next call.

While I have described my invention in connection with one specific embodiment thereof and demonstrated one of its applications, it is to be understood that various other embodiments and applications thereof may be made by those skilled in the art without departing from the spirit of the invention as defined within the scope of the appended claims.

What is claimed is:

1. A translating device comprising a plurality of cards arranged in a stack, each of said cards being notched to record an item of information, means for selecting one of said cards, and means controlled by the notches on all of said cards for indicating the item of information recorded on the selected card.

2. A translating device comprising a plurality of cards arranged in a stack, each of said cards being notched to record an item of information, the notches on said cards forming a plurality of grooves when said cards are stacked, means for withdrawing one of said cards partially out of the stack whereby said grooves are selectively blocked by the notches on the card so withdrawn, and means controlled by the unblocked grooves for indicating the item of information on the card withdrawn from the stack.

3. A translating device comprising a plurality of cards arranged in a stack, each of said cards being notched to record an item of information, the notches on said cards forming a plurality of grooves when said cards are stacked, means for selectively withdrawing one of said cards partially out of the stack whereby said grooves are selectively blocked by the notches on the card so withdrawn, bars adapted for intrusion into the unblocked grooves, and means controlled by said bars when fully intruded into the grooves for indicating the item of information recorded by the notches on the card partially withdrawn from the stack.

4. A translating device comprising a plurality of cards arranged in a stack, each of said cards being notched to record an item of inquiry and the answer therefor, means controlled by the notches in one of said cards that record the item of inquiry for selecting said card, and means controlled by the notches that record the answers on all of said cards for indicating the answer on the selected card.

5. A translating device comprising a plurality of cards arranged in a stack, each of said cards being notched to record an item of inquiry and the answer thereto, the notches on said cards forming a plurality of grooves when said cards are stacked, means controlled by the grooves which record the inquiries for withdrawing one of said cards partially out of the stack whereby the grooves formed by the notches recording the answers are selectively blocked, and means controlled by the unblocked grooves for indicating the answer recorded on the card partially withdrawn from the stack.

6. A translating device comprising a plurality of cards arranged in a stack, each of said cards being notched to record an item of inquiry and the answer thereto, the notches on said cards forming a plurality of grooves when the cards are stacked, means controlled by the grooves which record the inquiries for withdrawing one of said cards partially from the stack whereby the grooves formed by the notches that record the answers are selectively blocked, bars adapted for intrusion into the unblocked grooves, and means controlled by said bars when fully intruded into the grooves for indicating the answer recorded on the card partially withdrawn from the stack.

7. A translating device comprising a plurality of cards arranged in a stack, each of said cards having wide and narrow notches to record an item of inquiry and the answer thereto, the notches in said cards forming a plurality of grooves of varying widths when the cards are stacked, a bar coextensive with the length of each groove and adapted for intrusion in the narrow width thereof, means determined by the wide notches in the group of notches reserved for the inquiry on a card for intruding a bar in each groove indicated by said wide notches, means operative after the intrusion of said bars for withdrawing said card partially out of the stack whereby the grooves formed by the notches denoting answers are selectively blocked, and means for intruding a bar into each of the unblocked grooves whereby said intruded bars indicate the answer recorded on the card partially withdrawn from the stack.

8. A translating device comprising a plurality of cards arranged in a stack, each of said cards being provided with wide and narrow notches to record an item of inquiry and the answer thereto, all of said notches forming a plurality of grooves of varying widths when the cards are arranged in a stack, a bar for each groove adapted for intrusion into the narrow width thereof, a magnet for each bar individual to each groove formed by the aligned notches indicating an item of inquiry, the operation of said magnet causing the associated bar to be intruded into the correlated groove, means for selectively operating said magnets according to a combination indicated by the wide notches on a strip which forms part of the grooves that indicate items of inquiry whereby the bars controlled by said magnets are intruded into the grooves indicated by said wide notches to lock all cards except the one having the wide notches, means for withdrawing said card partially out of the stack whereby the grooves formed by the notches denoting answers are selectively blocked, and means for intruding other of said bars into the unblocked grooves whereby said last-mentioned intruded bars indicate the answer recorded on the card partially withdrawn from the stack.

9. A translating device comprising a plurality of cards arranged in a stack, each of said cards being provided with wide and narrow notches to record an item of information and the answer thereto, all of said notches forming a plurality of grooves of varying widths when the cards are arranged in a stack, a bar for each groove adapted to fit into the narrow width thereof, a magnet for each bar individual to each groove formed by the aligned notches indicating an item of inquiry, the operation of said magnet causing the associated bar to be intruded into the correlated groove, means for selectively operating said magnets according to the combination indicated by the wide notches on a card which form part of the grooves that indicate items of inquiry whereby the bars controlled by said magnets are intruded into the grooves indicated by said wide notches to lock all cards except the one having the wide notches, means for withdrawing said card partially out of the stack whereby the grooves formed by the notches denoting answers are selectively blocked, and electromagnetic means for intruding other of said bars into the unblocked grooves whereby said last-mentioned intruded bars indicate the answer recorded in the card partially withdrawn from the stack.

10. A translating device comprising a plurality of cards arranged in a stack, each of said cards being provided with wide and narrow notches to record an item of information and the answer thereto, all of said notches forming a plurality of grooves of varying widths when the cards are arranged in a stack, a bar for each groove adapted for intrusion into the narrow width thereof, a magnet for each bar individual to each groove formed by the aligned notches indicating an item of inquiry, the selective operation of said magnet according to the number of wide notches on a card of the notches indicating inquiries causing the associated bars to be intruded into grooves indicated by said wide notches, means for drawing said card out of the stack a distance equal to the difference between a wide and narrow notch, whereby the narrow notches of the notches denoting answers on the card immediately before and behind the card moved out of the stack are blocked by the narrow notches on the card moved out, and electromagnetic means for intruding other bars in the unblocked grooves whereby said intruded bars indicate the answer recorded in the card moved out of the stack.

11. A translating device comprising a plurality of cards arranged in a stack, each of said cards being provided with wide and narrow notches to record an item of information and the answer thereto, all of said notches forming a plurality of grooves of varying widths when the cards are arranged in a stack, a bar for each groove adapted for intrusion into the narrow width thereof, a magnet for each bar individual to each groove formed by the aligned notches indicating an item of inquiry, the selective operation of said magnets according to the combination indicated by the wide notches of the notches indicating the inquiry on a card causes the associated bars to be intruded into the grooves indicated by said notches, means for drawing said card out of the stack a distance equal to the difference between a wide and narrow notch, whereby the narrow notches of the notches indicating the answers on the cards immediately before and behind the card moved out of the stack are blocked by the narrow notches of the notches indicating the answers on said card, electromagnetic means for intruding other bars in the unblocked grooves, and work circuits controlled by said last-mentioned bars for indicating the answer recorded on the card moved out of the stack.

12. A translating device comprising a plurality of cards arranged in a stack, each of said cards being provided with wide and narrow notches to record an item of information and the answer thereto, all of said notches forming a plurality of grooves of varying widths when the cards are stacked, a bar for each groove adapted for intrusion into the narrow width thereof, a magnet for each bar individual to each groove the selective operation of said magnets according to the combination of wide notches of the notches that denote an inquiry on a card causing the associated bars to be intruded into grooves indicated by said wide notches and the release of said magnets causing the withdrawal of said bars from said grooves, means for drawing said card out of the stack a distance equal to the difference between a wide and narrow notch, whereby the narrow notches of the notches indicating the answers on the cards immediately in front and in back of the card moved out of the stack are blocked by the narrow notches of the notches indicating the answers on said strip, electromagnetic means operative to cause the intrusion of other of said bars in the unblocked grooves, said electromagnetic means when released being adapted to withdraw said bars from said grooves, work circuits controlled by said last-mentioned intruded bars for indicating the answer recorded on the card moved out of the stack, and means operative subsequent to the withdrawal of all of said last-mentioned bars from their associated grooves for pulling back into the stack the card which was moved out of the stack.

13. A translating device comprising a plurality of cards arranged in a stack, each of said cards being notched to record the binary representation of a number, means for selecting one of said cards, and means controlled by the notches on all of said cards for indicating the number on the selected card.

14. A translating device comprising a plurality of cards arranged in a stack, each of said cards having one group of notches to record the binary representation of a first number and another group of notches to record the binary representation of a second number, means controlled by said first group of notches in all of said strips for selectively marking one of said cards, and means controlled by the second group of notches in all of said cards for indicating the second number on said marked card.

15. A translating device comprising a plurality of cards arranged in a stack, each of said cards having one group of notches to record the binary representation of a number and a record group of notches to indicate the binary representation of a correlated number, said notches being arranged in pairs of wide and narrow notches to indicate the binary digit 1 and the binary digit 0 respectively, according to a designated arrangement of each pair of notches, means controlled by said first group of notches in all of said cards for selectively withdrawing one of said cards partially out of the stack whereby the narrow notches of the notches indicating the correlated numbers on the cards in front and in back of the card partially withdrawn from the stack are blocked and the wide notches are reduced to the size of narrow notches, and means controlled by said last-mentioned narrow notches on all the other cards and the reduced wide notches on the card partially withdrawn strip for indicating the correlated number on said card.

16. In a telephone system, the combination with a first register settable to designate a wanted office and a second register settable to control the selective positioning of selectors to reach said office, of a translator responsive to the setting of said first register for setting said second register, said translator comprising a plurality of cards arranged in a stack, each of said cards being notched to record the designation of an office, means responsive to the setting of said first register according to the designation of a wanted office for selecting the card individual to said office, and means controlled by the notches on all of said cards for operating said second register to the selective control setting required for said wanted office.

17. In a telephone system, the combination with a first register settable to designate the code of a wanted office and a second register settable to control the selective positioning of selectors to reach said office, of a translator responsive to the setting of said first register for setting said second register, said translator comprising a plurality of cards arranged in a stack, each of said cards having wide and narrow notches to record the code of an office and a correlated switching code indicative of the setting of said second register for controlling the selective positioning of selectors to reach said office, said notches forming grooves of varying widths when the cards are stacked, a bar for each groove adapted for intrusion into the narrow portion of the groove, means responsive to the setting of said first register according to the code of a wanted office for causing bars to be selectively intruded into those grooves formed by the office code notches which are indicated by the wide notches on the card individual to said office, means for withdrawing said card partially from the stack whereby the narrow notches of the notches indicating the switch codes on the cards in front and in back of the card withdrawn from the stack are blocked by the corresponding notches in the card partially withdrawn and the wide notches on said card are reduced to the width of narrow notches, means for intruding other of said bars in the unblocked grooves, and circuits completed by said last-mentioned intruded bars for setting said second register in accordance with the switching code on the card partially withdrawn from the stack.

18. In a telephone system, the combination with a first register settable to designate the code of a wanted office and a second register settable to control the selective positioning of selectors to reach said office, of a translator responsive to the setting of said first register for setting said second register, said translator comprising a plurality of cards arranged in a stack, each of said cards being individual to an office and notched to record the code of the office and a correlated code indicative of the setting required by said second register for controlling the selective positioning of selectors to reach said office, means responsive to the setting of said first register and controlled by the office code notches for selecting the card individual to the office indicated by the setting of said first register, and means controlled by the notches that record correlated codes after the selection of said card for setting said second register according to the correlated code recorded on said selected card.

19. In a telephone system, the combination with a first register settable to designate the code of a wanted office and a second register settable to control the selective positioning of selectors to reach said office, of a translator responsive to the setting of said first register for setting said second register, said translator comprising a plurality of cards arranged in a stack, each of said cards being individual to an office and provided with wide and narrow notches to record the code of the office and a correlated code indicative of the setting required by said second register for controlling the selective positioning of selectors to reach said office, all of said notches forming a plurality of grooves of varying widths when the cards are stacked, a bar for each groove adapted for intrusion into the narrow width thereof, a magnet for each bar individual to each groove formed by the notches that indicate office codes, means responsive to the setting of said first register for selectively operating said magnets to cause the intrusion of their associated bars into the grooves which include only the wide notches of the office code notches on the card individual to the office, means for withdrawing said card out of the stack a distance equal to the difference between a wide and narrow notch, whereby the narrow notches indicating the correlated codes on the cards immediately in front and in back of the card moved out of the stack are blocked by the narrow notches of the notches indicating the correlated code on said card, electromagnetic means operative to cause the intrusion of other bars in the unblocked grooves, said electromagnetic means, when released, being adapted to withdraw the bars from said unblocked grooves, and means controlled by said last-mentioned intruded bars for setting said second register according to the correlated code recorded on the card partially withdrawn from the stack.

GEORGE R. STIBITZ.